(12) United States Patent
Okumura

(10) Patent No.: US 8,922,855 B2
(45) Date of Patent: Dec. 30, 2014

(54) PRINTING APPARATUS

(71) Applicant: Seiko Epson Corporation, Tokyo (JP)

(72) Inventor: Yoshio Okumura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/757,083

(22) Filed: Feb. 1, 2013

(65) Prior Publication Data

US 2013/0208035 A1 Aug. 15, 2013

(30) Foreign Application Priority Data

Feb. 13, 2012 (JP) ................... 2012-028384

(51) Int. Cl.
| | |
|---|---|
| *G01B 9/02* | (2006.01) |
| *B41J 29/38* | (2006.01) |
| *B41J 2/195* | (2006.01) |
| *B41J 2/21* | (2006.01) |

(52) U.S. Cl.
CPC . *B41J 2/195* (2013.01); *G01B 9/02* (2013.01); *B41J 2/2107* (2013.01)
USPC .............................. 358/521; 347/5

(58) Field of Classification Search
CPC ............ G01N 21/57; B41J 2/205; B41J 2/21
USPC ...................... 347/15; 427/494; 358/3.06–3.2
See application file for complete search history.

(56) References Cited

U.S. PATENT DOCUMENTS

| | | | | |
|---|---|---|---|---|
| 5,370,979 | A | 12/1994 | Kume | 430/506 |
| 7,605,943 | B2 | 10/2009 | Berns et al. | 358/1.9 |
| 7,652,789 | B2 | 1/2010 | Berns et al. | 358/1.9 |
| 7,706,604 | B2 | 4/2010 | Berns et al. | 382/162 |
| 2009/0244137 | A1* | 10/2009 | Kakutani | 347/12 |
| 2009/0244168 | A1* | 10/2009 | Kakutani | 347/21 |
| 2010/0053247 | A1* | 3/2010 | Kakutani | 347/12 |
| 2010/0053267 | A1* | 3/2010 | Seishin | 347/43 |
| 2010/0177354 | A1* | 7/2010 | Yoshida | 358/3.01 |

FOREIGN PATENT DOCUMENTS

| | | |
|---|---|---|
| JP | 2007-511161 | 4/2007 |
| JP | 2007-511175 | 4/2007 |
| JP | 2007-516663 | 6/2007 |
| JP | 4388554 | 10/2009 |

OTHER PUBLICATIONS

G. Wyszeck et al., "Color Science: Concepts and Methods, Quantitative Data and Formulae, Second Edition" Wiley Interscience, pp. 486-487 and 829, Aug. 2000.
CIE Technical Report, "Colorimetry" CIE 15, 3rd Edition, pp. 7-9, 2004.
C.S. McCamy, "Observation and Measurement of the Appearance of Metallic Materials, Part I, Macro Appearance" COLOR research and application, vol. 21, Issue 4, pp. 292-304, 1996.

* cited by examiner

*Primary Examiner* — Stephen Meier
*Assistant Examiner* — Renee I Wilson
(74) *Attorney, Agent, or Firm* — DLA Piper LLP (US)

(57) ABSTRACT

In a printing apparatus which performs printing by using special ink for generating special glossiness on a printed material and color inks, the apparatus includes a controller that, when an image in which an index value indicating a degree of the special glossiness is low and an image in which the index value is high are to be printed adjacently, controls to print the image in which the index value is low by substituting other inks for the special ink.

3 Claims, 7 Drawing Sheets

SPECIAL INK SPECIFICATION SCREEN

PRINTING APPARATUS

CROSS-REFERENCE TO RELATED APPLICATIONS

The entire disclosure of Japanese Patent Application No. 2012-28384, filed Feb. 13, 2012 is expressly incorporated by reference herein.

BACKGROUND

1. Technical Field

The present invention relates to processing on special ink which generates special glossiness on a printed material.

2. Related Art

A printing apparatus performs printing by selecting an ink volume corresponding to input color data and printing the ink volume on a sheet or the like. Therefore, a method of color matching for selecting an optimum ink volume for the input color data has been disclosed (for example, see, JP-T-2007-511175 and Japanese Patent No. 4388554).

Further, a printing apparatus using special ink which generates special glossiness on a printed material has been known. For example, such special ink contains a metal in addition to pigment. Therefore, appearance of a color of dots changes depending on the observation angles to the printed material so as to generate special glossiness.

When printing is performed by using the special ink, there arises the following problem in some cases. Contrast among different colors on the printed material is lower in comparison with a case where the special ink is not used and preferable texture of the printed material is not obtained for the following reason. That is, in the color matching, matching with the input color data is performed based on colorimetric values of inks. However, the calorimetric value of the special ink also changes depending on the observation angles. Therefore, a brightness difference is generated between the colorimetric value and actual color appearance in some cases. Accordingly, the contrast becomes lower on the printed material in some cases.

SUMMARY

An advantage of some aspects of the invention is to improve texture of a printed material when special ink is used.

A printing apparatus according to an aspect of the invention which performs printing by using special ink for generating special glossiness on a printed material and color inks includes a controller that, when an image in which an index value indicating a degree of the special glossiness is low and an image in which the index value is high are to be printed adjacently, controls to print the image in which the index value is low by substituting other inks for the special ink.

In the aspect of the invention having the above configuration, if the image in which the index value indicating the degree of the special glossiness is low and the image in which the index value is high are printed adjacently, a brightness difference becomes higher. In this case, when a volume of the special ink is large on the image in which the index value is low, the brightness difference between both images is lowered depending on the observation angles. In order to solve the problem, printing is performed by substituting other inks for the special ink. With this, the volume of the special ink becomes smaller on the image in which the index value is low, and the brightness becomes uniform regardless of the observation angles. This makes it possible to keep the brightness difference between the image in which the index value is low and the image in which the index value is high to be higher.

It is preferable that the image in which the index value is low contain black ink and the other inks be inks other than the black ink.

Since the index value becomes lower on the image containing the black ink, the image is more likely to be influenced by the difference in brightness depending on the observation angles. Therefore, if the inks other than the black ink are substituted for the special ink on the image containing the black ink, the brightness is made uniform regardless of the observation angles and the brightness difference between the image of which the index value is low and the image of which the index value is high can be made higher.

A printing apparatus according to another aspect of the invention which performs printing by using an ink volume containing special ink for generating special glossiness on a printed material and corresponding to input color data includes a substitution volume acquisition unit that acquires a substitution volume by which other inks are substituted for the special ink in the ink volume based on an index value indicating the degree of special glossiness of the ink volume, a modification unit that modifies the ink volume based on the acquired substitution volume, and a printing execution unit that performs printing by using the modified ink volume.

In the aspect of the invention having the above configuration, other inks are substituted for the special ink contained in the ink volume based on the index value indicating the degree of special glossiness of the ink volume. For example, a substitution volume is set for an image in which the index value is high such that a usage volume of the special ink is kept. On the other hand, the substitution volume by which other inks are substituted for the special ink is set to be large for an image in which the index value is low. Therefore, the contrast on the printed material can be adjusted based on the index value so as to maintain texture of the printed material.

Further, the concept of the invention can be also applied to a printing method of performing printing by using an ink volume containing special ink and a program which causes a computer to realize a function of specifying an ink volume corresponding to input color data in addition to the printing apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention is described.

First Embodiment

Configuration of Printing Apparatus

Figure 1:
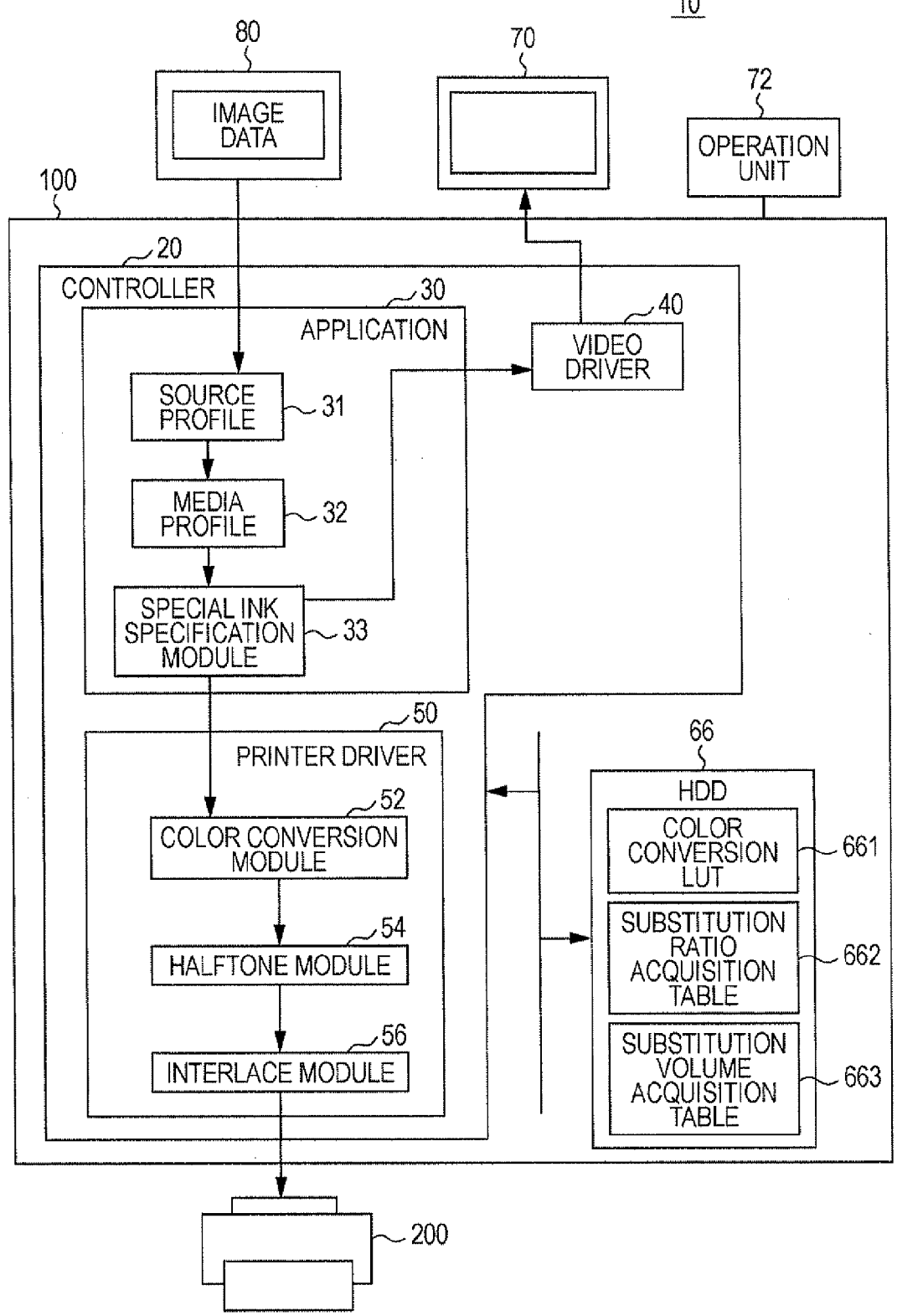
FIG. 1 is a schematic configuration view illustrating a printing apparatus.
Figure 2:
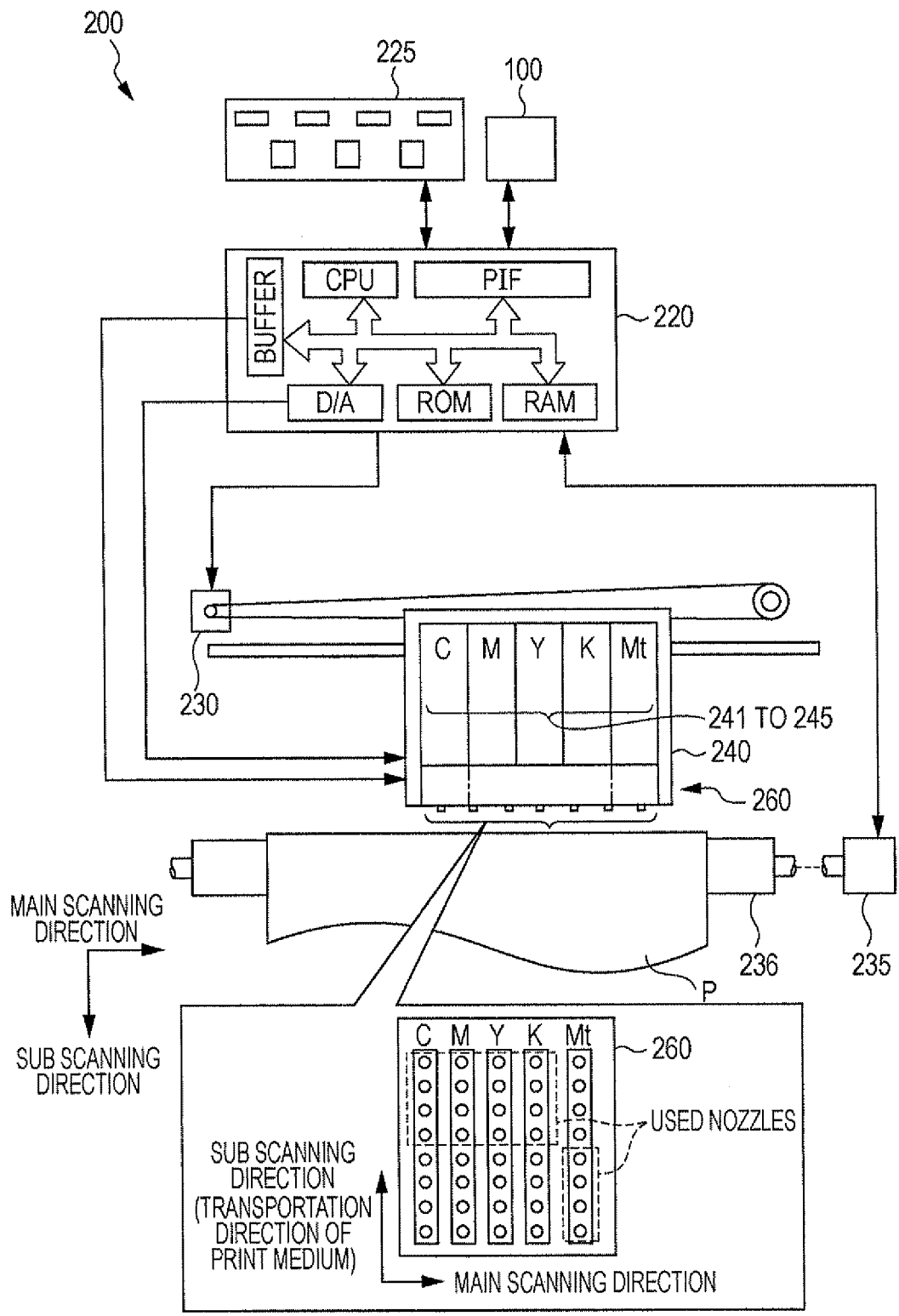
FIG. 2 is a view illustrating a schematic configuration of the printing apparatus.
Figure 3:
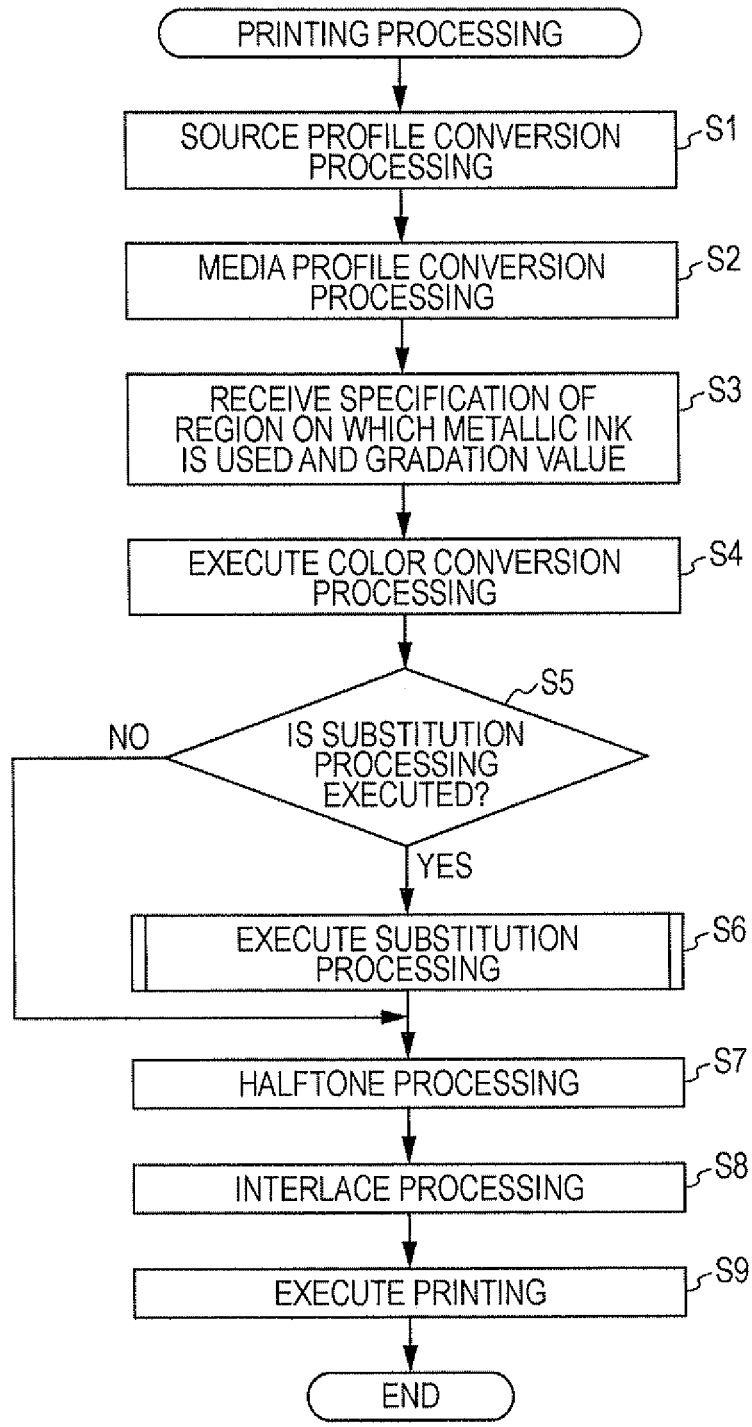
FIG. 3 is a flowchart for explaining printing processing.

FIG. 1 is a schematic configuration view illustrating a printing apparatus 10. FIG. 2 is a view illustrating a schematic configuration of the printing apparatus 10. FIG. 3 is a flowchart for explaining printing processing.

The first embodiment is realized by the printing apparatus 10 constituted by a computer 100 as a printing control device, a printer 200 which actually prints an image under the control by the computer 100, and the like. Here, the printing apparatus 10 functions entirely as a printing apparatus in a broad sense.

The computer 100 includes a controller 20 and a hard disk 66. For example, the controller 20 is constituted by a CPU, a ROM, and a RAM, and can perform operation with predetermined programs. Further, a display 70 and an operation unit 72 constituted by a keyboard and a mouse are connected to the computer 100 with cables. In addition, a predetermined operating system is installed on the computer 100 and an application program 30, a video driver 40, and a printer driver 50 are operated under the operating system. The controller 20 reads out and executes programs from the ROM and an HDD 66 so that the functions of the programs are realized.

The application program 30 is a program for reproducing image data ORG acquired from a memory card as a data supply unit 80. In the image data ORG recorded in the data supply unit 80, gradation values indicating usage volumes of respective color data of red (R), green (G), and blue (B) are recorded for each pixel. Further, the application program 30 is a program for setting a region on which metallic ink is used and a volume (gradation value) of the metallic ink to be used on the region to the reproduced image data ORG. Therefore, the controller 20 executes the application program 30 so as to function as a special ink specification module 33.

A color conversion LUT 661 is a table on which input color data and an ink volume set are recorded in a correspondence manner. In the embodiment, the input color data contain red (R), green (G), and blue (B) indicating chromatic values and a gradation value Qm indicating a usage volume of metallic as color component values. Further, coordinates on a color space defined by the values of the input color data are also referred to as grid points. The ink volume set contains cyan (C), magenta (M), yellow (Y), black (K), and metallic ink (Mt) as color component values. Therefore, the ink volume set constituted by the respective values of C, M, Y, K, and Mt is made to correspond to the grid points defined by four values (R, G, B, Qm) in the color conversion LUT 661. It is to be noted that correspondence between the input color data and the ink volume set is set based on values (for example, L*a*b* values) on an isochromatic color space.

The metallic ink is described in detail. The metallic ink is ink which generates metallic glossiness on a printed material. As the metallic ink, for example, an oil-based ink composition containing metal pigment, an organic solvent, and a resin can be used. In order to effectively generate metallic texture visually, the metal pigment is preferably formed with flat plate-like particles. When the longitudinal diameter of the flat plate-like particle on a plane is assumed to be X, the shorter diameter thereof is assumed to be Y, and the thickness thereof is assumed to be Z, it is preferable that the 50% mean particle diameter R50 of an equivalent circle diameter determined from the area of the plate-like particle in the X-Y plane be in a range of 0.5 to 3 μm and a condition of R50/Z>5 be satisfied.

The metal material can be formed with aluminum or an aluminum alloy, for example. A concentration of the metal pigment contained in the metallic ink can be set to 0.1 to 10.0 wt %, for example. It is needless to say that the composition of the metallic ink is not limited thereto and other compositions can be employed appropriately as long as the compositions generate metallic feeling.

Further, a color conversion module 52, a halftone module 54, and an interlace module 56 are included in the printer driver 50.

The color conversion module 52 converts the color component values (R, G, B, Qm) of the respective pixel data of the image data ORG which have been acquired from the application program 30 to a set of ink volumes (ink volume set) of ink colors provided in the printer 200.

The halftone module 54 performs binary processing on the ink volume set after the color conversion so as to perform dot data generation processing (hereinafter, also referred to as halftone processing). To be more specific, the halftone module 54 generates dot data representing the image data by ON/OFF of dots by using a dither matrix which has been prepared by the printer driver 50 previously.

In addition, the interlace module 56 rearranges the arrangement of the generated dot data to the order in which the dot data are to be transferred to the printer 200 and outputs the dot data to the printer 200. Further, the interlace module 56 outputs various types of commands such as a print start command and a print end command to the printer 200.

Next, a configuration of the printer 200 is described. As illustrated in FIG. 2, the printer 200 includes a control circuit 220 and an operation panel 225. The control circuit 220 controls the printer overall and receives print data from the computer 100. In addition, the printer 200 includes a mechanism for transporting a print medium P by a sheet feeding motor 235, a mechanism for reciprocating a carriage 240 in the axial direction of a platen 236 by a carriage motor 230, a mechanism for driving a printing head 260 to discharge ink to form dots, the sheet feeding motor 235, the carriage motor 230, and the printing head 260.

The control circuit 220 is configured by connecting a CPU, a ROM, a RAM, a PIF (peripheral interface) and the like to one another through a bus. The control circuit 220 controls operations of the carriage motor 230 and the sheet feeding motor 235 so as to control a main scanning operation and a sub scanning operation of the carriage 240. Further, if the control circuit 220 receives the print data output from the computer 100 through the PIF, the control circuit 220 supplies a driving signal based on the print data to the printing head 260 in accordance with the movements of the main scanning and the sub scanning by the carriage 240 so as to drive the printing head 260.

Cartridges 241 to 245 which accommodate color inks of cyan ink (C), magenta ink (M), yellow ink (Y), and black ink (K) and metallic ink (Mt) having metallic glossiness, respectively, are mounted on the carriage 240. Ink discharge heads of five types in total corresponding to the respective colors are formed on the printing head 260 on the lower portion of the carriage 240. In the embodiment, the ink cartridge 241 to 245 are arranged in the order from C, M, Y, K, and Mt in the main scanning direction of the carriage 240, as illustrated in FIG. 2. A piezoelectric element is provided for each nozzle. The control circuit 220 controls contraction motion of the piezoelectric elements so that the printer 200 can form dots for each ink color.

Printing Processing

Figure 4A:
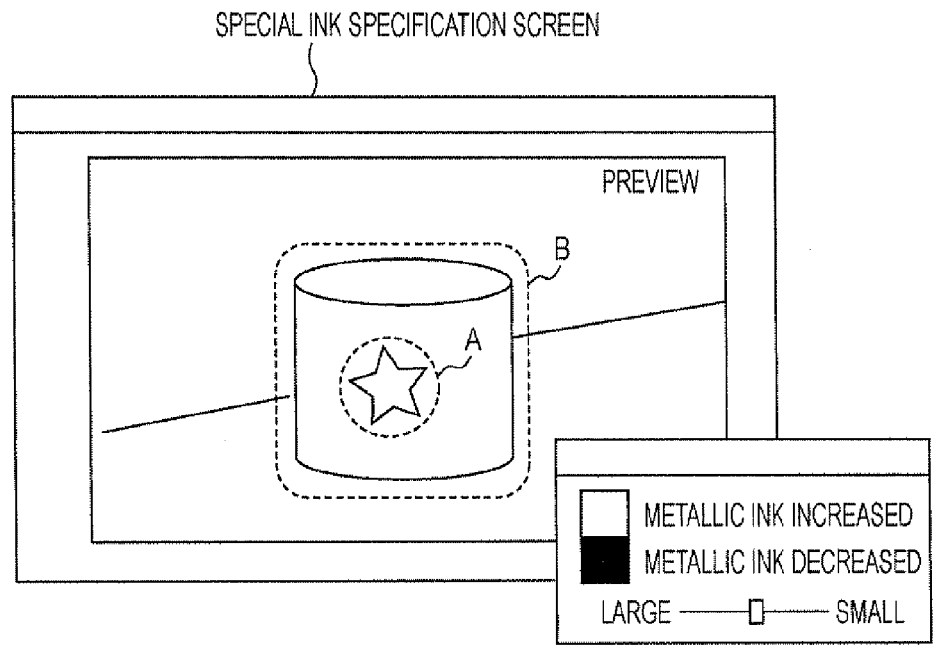
FIGS. 4A and 4B are a view and a graph for explaining the printing processing.
Figure 4B:
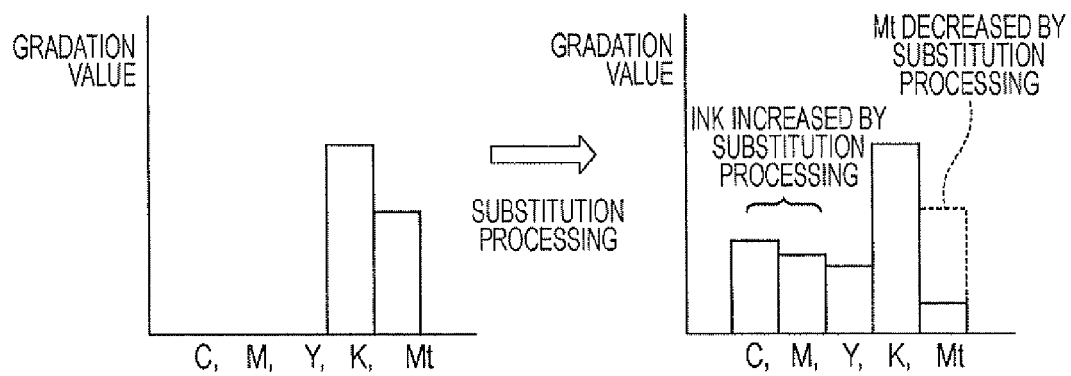

Next, printing processing to be performed by using the image data ORG by the printing apparatus 10 is described with reference to FIG. 3. The printing processing is started if a user directs to print the image data ORG acquired on the application program 30. FIGS. 4A and 4B are a view and a graph for explaining the printing processing.

At step S1, the controller 20 performs conversion processing using a source profile 31 on the image data ORG with the function of the application program 30. The source profile 31 is a three-dimensional table for converting the color component values of the image data ORG to print standard colors which have been set previously. That is to say, the color component values (R, G, B) of the image data ORG are converted to a set of (L*, a*, b*) values by the source profile 31.

At step S2, the controller 20 performs conversion processing using a media profile 32 on the converted image data ORG with the function of the application program 30. The media profile 32 is a three-dimensional table for reproducing the color component values of the image data ORG on a predetermined print medium. That is to say, the color component values (L*, a*, b*) of the image data ORG, which have been converted by using the source profile 31, are converted to color component values of a set of (R, G, B) by the media profile 32.

At step S3, the controller 20 receives specification of a region (pixels) on which the metallic ink is to be used and the gradation value Qm of the metallic ink on the image data ORG with the function of the special ink specification module 33. As illustrated in FIG. 4A, the controller 20 displays a special ink specification screen on the display 70 and receives the region on which the metallic ink is specified to be used and the specification of the gradation value Qm on the screen. For example, if a user operates a region selection icon displayed on the special ink specification screen, a range of pixels on which the metallic ink is specified to be used is specified. Further, if the user changes a slide bar indicating a usage volume (gradation value) of the metallic ink, the gradation value Qm is specified.

The controller 20 updates the component values of the image data ORG based on the region on which the metallic ink is to be used and the gradation value Qm which have been received. For example, the gradation value Qm is recorded as 0 for a region (pixels) on which the metallic ink is not to be used.

At step 84, the controller 20 performs color conversion processing by using the color conversion LUT 661 with the function of the color conversion module 52. With the color conversion processing, the color component values (R, G, B, Qm) of the image data ORG are converted to an ink volume set (C, M, Y, K, Mt). The controller 20 records the ink volume set after the color conversion. The recorded ink volume set is used in substitution processing (step S6), which will be described later. In addition, when the substitution processing is not selected, printing processing is performed by using the ink volume set. Hereinafter, the image data ORG after the color conversion are also referred to as ink volume data.

At step S5, the controller 20 receives whether or not the substitution processing is to be performed on the ink volume data after the color conversion. For example, if a user inputs to perform the substitution processing on a UI screen (not illustrated) (step S5: YES), the controller 20 performs the substitution processing on the ink volume data at step S6. On the other hand, if the user inputs so as not to perform the substitution processing on the UI screen (not illustrated) (step S5: NO), the controller 20 does not perform the substitution processing on the ink volume data and the process proceeds to step S7.

If a configuration in which the execution of the substitution processing can be selected arbitrarily by a user is employed, when image quality of the printed material on which the substitution processing has been performed does not fit user's preference, the substitution processing is not executed so as to expand a range of choices on the image quality for the user.

At step S6, the controller 20 performs substitution processing of modifying metallic ink contained in the ink volume data acquired at step S4. In the substitution processing, processing of substituting other inks (C, M, Y) for the metallic ink based on a metallic index value Dm is performed. The metallic index value Dm is a value indicating the degree of glossiness on the ink volume set including the metallic ink and the color inks. Further, as the metallic index value Dm is higher, brightness of the ink volume set when observed at an observation angle $\theta$ is higher.

As illustrated in FIG. 4A, a case where an image A is formed on a predetermined region of the printed material by using the color ink of any of C, M and Y and the metallic ink, and a background image B of the image A is formed by using the black ink and the metallic ink is supposed. Further, a case where a usage volume of the metallic ink is increased on the image A and a brightness difference (contrast) between the image A and the background image B is made higher in order to emphasize the texture is supposed.

The brightness of the metallic ink changes depending on the observation angles $\theta$. Therefore, the brightness of the image A and the brightness of the background image B also change depending on the observation angles $\theta$ because the image A and the background image B are formed by containing the metallic ink. For example, even if the brightness of the background image B at a standard observation angle $\theta s$ is Ls, the brightness of the background image B at an observation angle $\theta 1$ is L1 (Ls<L1) in some cases. In such a case, the contrast between the image A and the background image B at the observation angle $\theta 1$ is lower than the contrast therebetween at the observation angle $\theta s$. Therefore, at the observation angle $\theta 1$, the contrast is lowered so that texture of the image A is not preferably expressed.

In particular, when the black ink is mixed while the metallic ink is mainly used in order to reproduce black, the change in brightness depending on the observation angles becomes significant because of the effect of the metallic ink.

Then, in the invention, other inks are substituted for the metallic ink based on the metallic index value Dm indicating the glossiness of the ink volumes when observed at a predetermined observation angle so as to maintain the texture of the image. That is to say, priority is given to a usage volume of the metallic ink for the ink volume set having a high metallic index value Dm. Therefore, a substitution volume by which other inks are substituted for the metallic ink is decreased. On the other hand, when the metallic index value Dm is low, the brightness of the ink is low as a result. Therefore, priority is given to suppression of lowering of the contrast due to the change in the brightness and the substitution volume is increased.

FIG. 4B is a graph for explaining substitution of other inks for the metallic ink. In the substitution processing, other inks are substituted for the metallic ink such that chroma of dots to be formed does not change. To be more specific, when the metallic ink contains aluminum, a value of the metallic ink in an L*a*b* color space corresponds to an achromatic value (value on a gray scale) with no chroma (value on the a*b* plane).

Further, if C, M, and Y are mixed at a predetermined ratio, a value on the gray scale is obtained. The value on the gray scale has no value in the chroma direction (on the a*b* plane in the L*a*b*color space). Therefore, even when C, M, and Y are increased (C, M, and Y are substituted for metallic) at the predetermined ratio, color appearance does not change largely. Accordingly, in the substitution processing, the inks of C, M, and Y are substituted for the metallic ink so as to decrease the metallic ink. It is needless to say that when the metallic ink has predetermined chroma, a mixture ratio of other inks is set such that the chroma of other inks after being mixed matches with the chroma of the metallic ink.

It is to be noted that the method of the substitution processing is described in more detail in "substitution processing", which will be described later.

Thereafter, at step S7, the controller 20 performs the halftone processing on the ink volume data after the substitution processing with the function of the halftone module 54. Further, when the user does not select the substitution processing at step S5, the halftone processing is performed on the ink volume data on which the color conversion processing has been performed at step S4.

Then, the controller 20 performs interlace processing on the ink volume data after the halftone processing with the function of the interlace module 56 at step S8.

Subsequently, at step S9, the ink volume data after the processing is output to the printer 200, and actual printing in the printer 200 is executed. Therefore, the printer 200 functions as a printing execution unit according to the invention.

Substitution Processing

Figure 5:
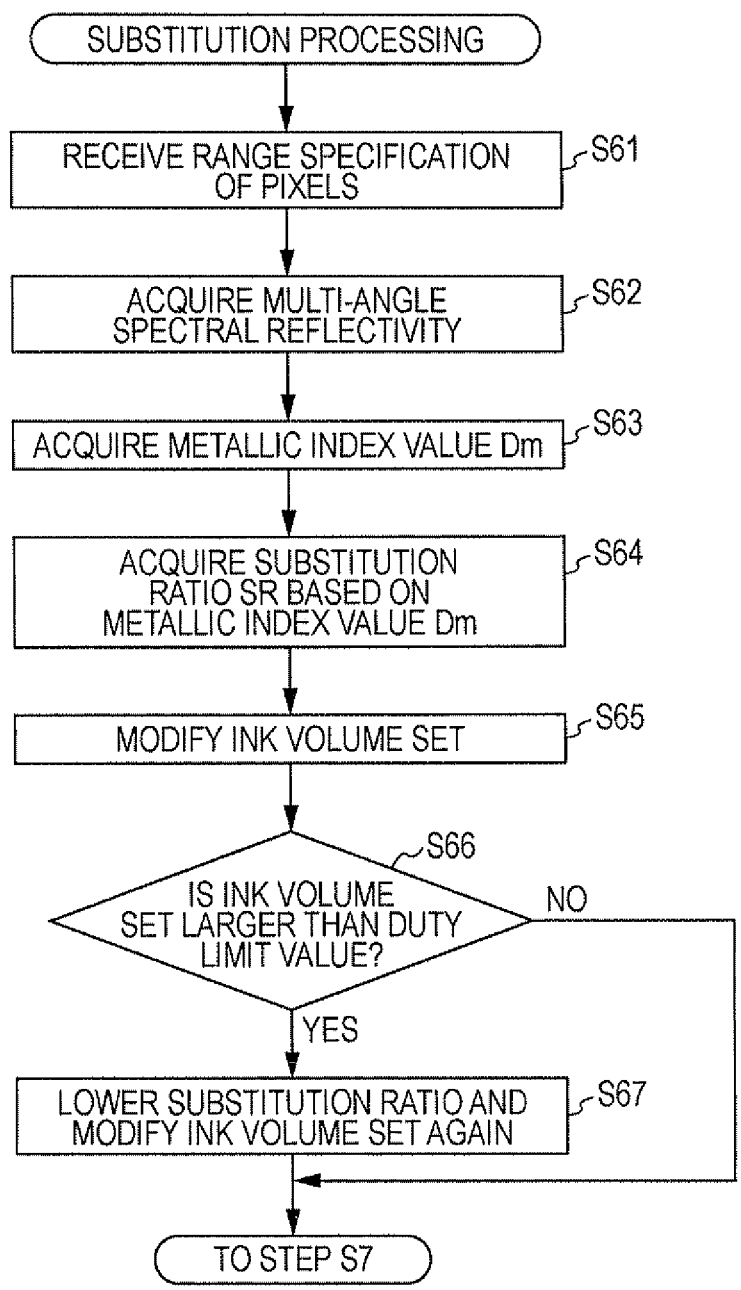
FIG. 5 is a flowchart illustrating processing at step S6 in FIG. 3 in detail.
Figure 6A:
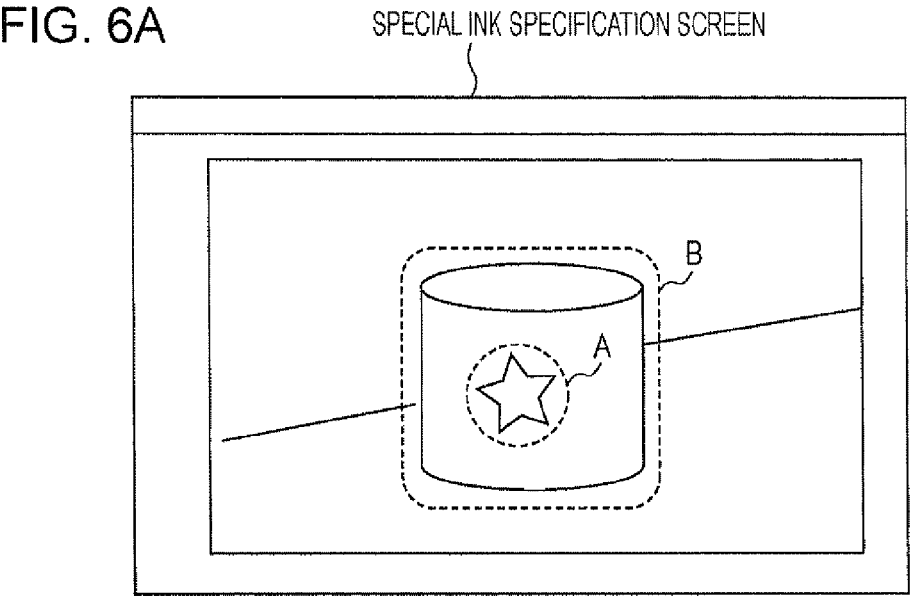
FIGS. 6A to 6C are a view and graphs for explaining substitution processing.
Figure 6B:
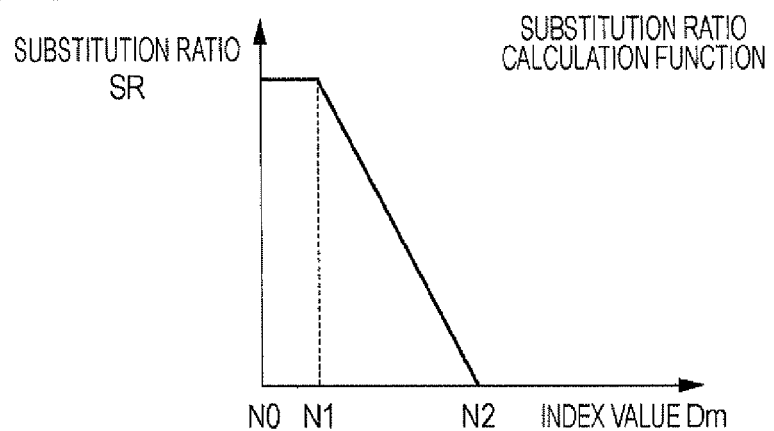
Figure 6C:
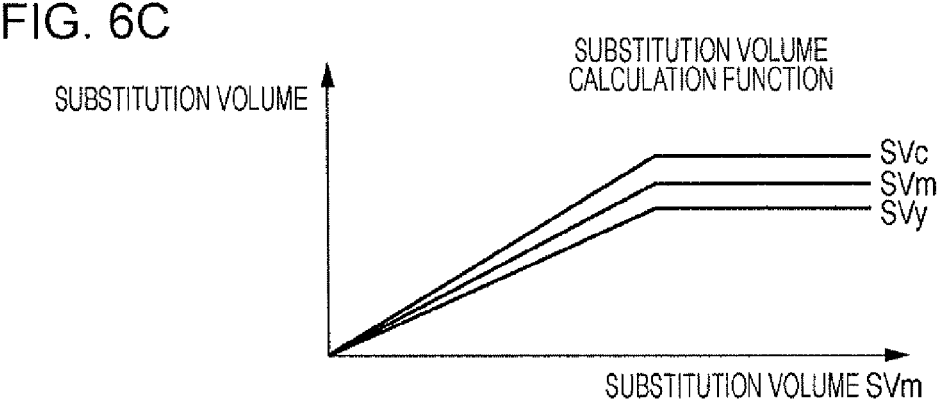

Next, the substitution processing which is executed at step SG is described in detail. FIG. 5 is a flowchart illustrating the processing at step S6 in FIG. 3 in detail. With the processing as illustrated in FIG. 5, the substitution processing by which other inks are substituted for the metallic ink is performed. Further, FIGS. 6A to 6C are a view and graphs for explaining the substitution processing.

At step S61 in FIG. 5, the controller 20 controls to display the special ink specification screen in the same manner as the processing at step S6 and receives range specification of pixels on which the substitution processing is to be performed from the user through the special ink specification screen. For example, as illustrated in FIG. 6A, it is assumed that the range specification has been made on a region including the background image B.

Then, at step S62, the controller 20 acquires multi-angle spectral reflectivity of the pixels on which the substitution processing has been specified to be performed on the ink volume set. To be more specific, the controller 20 includes a multi-angle spectral printing model converter RC to which ink volume set is input and which outputs the multi-angle spectral reflectivity.

Figure 7A:
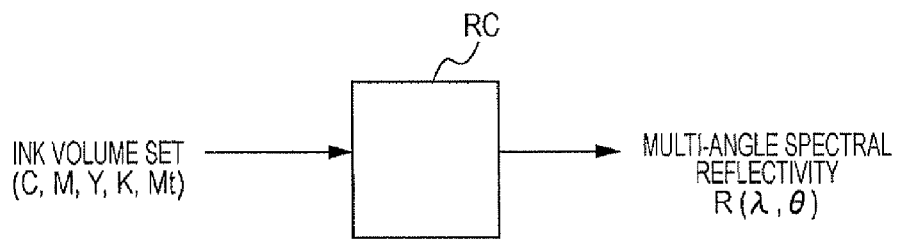
FIGS. 7A and 7B are views for explaining a multi-angle spectral printing model converter RC.
Figure 7B:
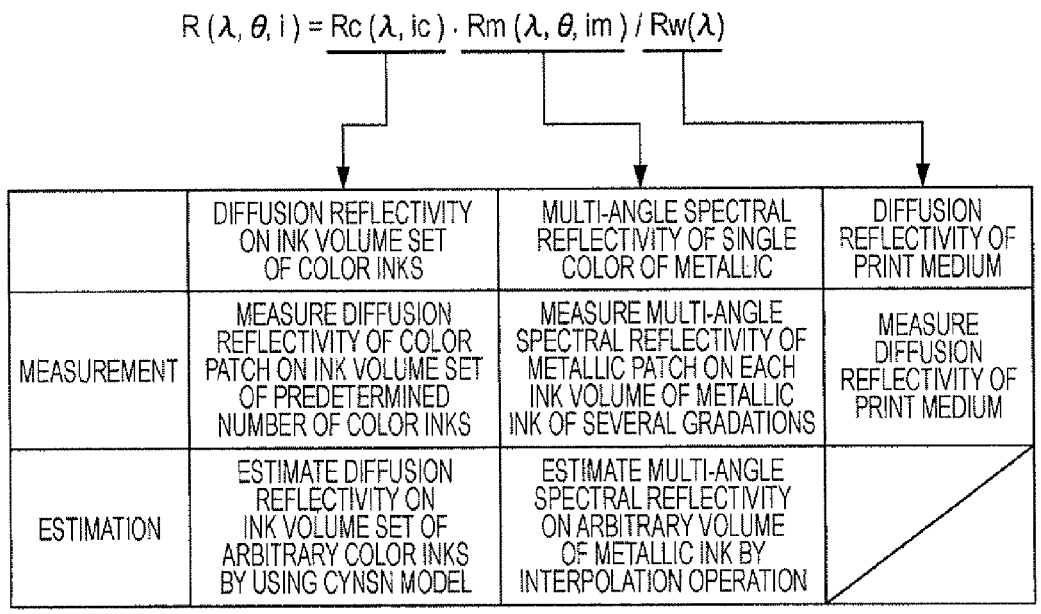

FIGS. 7A and 7B are views for explaining the multi-angle spectral printing model converter RC. As illustrated in FIG. 7A, the multi-angle spectral printing model converter RC is a converter which converts an arbitrary ink volume set (C, M, Y, K, Mt) to multi-angle spectral reflectivity $R(\lambda, \theta)$. The spectral reflectivity $R(\lambda, \theta)$ at a predetermined observation angle $\theta m$ ($\theta m$: 0° to 180°) on the arbitrary ink volume set (C, M, Y, K, Mt) is acquired by the multi-angle spectral printing model converter RC. In the embodiment, a multi-angle spectral printing model $R(\lambda, \theta)$ is defined in the following equation (1).

$$R(\lambda, \theta, i) = Rc(\lambda, ic) \cdot Rm(\lambda, \theta, im)/Rw \quad (1)$$

$\lambda$: Wavelength component of reflected light
$\theta$: Reflected angle component of reflected light
i: Ink volumes (C, M, Y, K, Mt)
ic: Ink volume set (C, M, Y, K) of color inks
im: Ink volume (Mt) of metallic ink In the equation (1), $Rc(\lambda, ic)$ indicates spectral reflectivity of a print image on the ink volume set ic of color inks (C, M, Y, K) other than the metallic ink Mt (standard observation angle $\theta s$: incident angle of incident light: 45° with respect to a print surface, observation angle: perpendicular to the print surface). $Rm(\lambda, \theta, im)$ indicates a multi-angle spectral printing model of the print image on the ink volume im of a single color of the metallic ink. $Rw(\lambda)$ indicates spectral reflectivity (diffused reflectivity) of a ground color of a predetermined print medium, that is, a print medium to be used for the printing processing.

As illustrated in FIG. 7B, the multi-angle spectral printing model converter RC estimates the multi-angle spectral reflectivity $R(\lambda, \theta)$ of the arbitrary ink volume set (C, M, Y, K, Mt) from measured values (colorimetric values) of $Rc(\lambda, ic)$, and $Rm(\lambda, im)$ on the predetermined number of ink volume set (C, M, Y, K, Mt).

For example, the spectral reflectivity $Rc(\lambda, ic)$ of the color inks and the multi-angle spectral reflectivity $Rm(\lambda, \theta, im)$ of the metallic ink are acquired by actually printing and forming color patches while changing the gradation values of the inks (C, M, Y, K, Mt) and measuring colors of the color patches with a spectral reflectometer. Alternatively, the spectral reflectivity $Rc(\lambda, ic)$ may be estimated by using a color estimation model from color measurement results at a plurality of representative points in an ink volume space of the color inks (C, M, Y, K). As the color estimation model, a cellular yule-niclsen spectral neugebauer model (CYNSN) has been known. It is to be noted that the cellular yule-niclsen spectral neugebauer model is a well-known technique (for example, disclosed in JP-T-2007-511161) and description thereof is omitted.

In the same manner, $Rw(\lambda)$ is acquired by actually measuring a color of the print medium with the spectral reflectometer.

The multi-angle spectral printing model converter RC acquires the multi-angle spectral reflectivity $R(\lambda, \theta, i)$ through the operation using the equation (1) based on the spectral reflectivity $Rc(\lambda, ic)$ of the color inks (C, M, Y, K), the multi-angle spectral reflectivity $Rm(\lambda, \theta, im)$ of the metallic ink (Mt), and the spectral reflectivity $Rw(\lambda)$ of the ground color which have been acquired as described above.

At step S63, the controller 20 acquires the metallic index value Dm of the ink volume set based on the multi-angle spectral reflectivity $R(\lambda, \theta)$ acquired at step S62. For example, when the metallic index value Dm is set to an L* value in brightness at the standard observation angle $\theta s$, the metallic index value Dm is acquired in the following manner. First, the controller 20 acquires the spectral reflectivity $R(\lambda, \theta s)$ at the predetermined observation angle $\theta s$ in the acquired multi-angle spectral reflectivity $R(\lambda, \theta)$. Next, the controller 20 coverts the spectral reflectivity $R(\lambda, \theta s)$ to L*a*b* values by using a well-known conversion equation. Then, the controller 20 sets the L* value in brightness in the acquired L*a*b* values as the metallic index value Dm.

Note that the observation angle $\theta$ at which the metallic index value Dm is acquired is not limited to one and an average of a plurality of observation angles $\theta$ may be set as an angle at which the metallic index value Dm is acquired. Therefore, if a configuration in which the metallic index value Dm is acquired based on the multi-angle spectral reflectivity $R(\lambda, \theta)$ is employed, texture of the printed material at an observation angle $\theta$ desired by the user can be maintained.

At step 864, the controller 20 acquires a substitution ratio SR of the metallic ink to other inks based on the acquired metallic index value Dm. The substitution ratio SR is a value indicating a ratio of the metallic ink for which other inks are to be substituted, of the metallic ink specified for the pixels. That is to say, when the substitution ratio SR is 100%, other inks (C, M, Y) are substituted for all the metallic ink specified for the pixels. Further, when the substitution ratio SR is 0%, there is no substitution of the metallic ink specified for the pixels.

In the embodiment, a substitution ratio acquisition table 662 on which a correspondence relationship between the metallic index value Dm and the substitution ratio is defied is recorded in the HDD 66. On the substitution ratio acquisition table 662, a substitution ratio of the metallic ink to other inks is defined based on the substitution ratio calculation function defined previously. The substitution ratio calculation function is a function for defining the correspondence relationship between the metallic index value Dm and the substitution ratio SR.

As illustrated in FIG. 6B, the substitution ratio calculation function sets the substitution ratio SR to 100% in a band in which the metallic index value Dm is low in a range of Dm=N0 to Dm=N1. In an intermediate region in which the metallic index value Dm is in a range of N1 to less than N2, as the metallic index value Dm is higher, the substitution ratio SR is lowered monotonically between 100% and 0%. Further, in a region in which the metallic index value Dm is equal to or higher than N2, the substitution ratio SR is 0%.

It is to be noted that threshold values N1 and N2 with which the substitution ratio SR is defined to be changed are values to be determined in accordance with a type of ink and a print target medium.

Further, the monotonic decrease of the substitution ratio SR in the intermediate region is merely an example and a form other than that may be employed.

A substitution volume acquisition unit and a substitution volume acquisition function according to the invention are realized with the processing at step S64.

At step S65, the controller 20 modifies the ink volume set specified for the corresponding pixels based on the acquired substitution ratio SR. Therefore, first, the controller 20 multiplies the substitution ratio SR acquired at step S64 by the volume (Mt) of the metallic ink specified for the corresponding pixels so as to acquire a substitution volume SVme of the metallic ink. Then, substitution volumes (SVc, SVm, SVy) of the ink volumes of C, M, Y which correspond to the acquired substitution volume SVme are acquired. As an example thereof, the printing apparatus 10 records, in the HDD 66, a substitution volume acquisition table 663 on which a correspondence relationship between the substitution volume SVme of the metallic ink and the substitution volumes SVc, SVm, and SVy of the respective inks of C, M, and Y is recorded.

As illustrated in FIG. 6C, the relationship between the substitution volume SVme and the substitution volumes SVc, SVm, and SVy, which is recorded in the substitution volume acquisition table 663, is set based on a substitution volume acquisition function. As an example, the substitution volume acquisition function sets values thereof such that color appearance is neutral gray when dots of C, M, and Y are mixed by using the substitution volumes. It is needless to say that when the metallic ink has predetermined chrome, the substitution volumes SVc, SVm, and SVy are set such that the chroma obtained by mixing other inks matches with the chroma of the metallic ink.

Then, the controller 20 modifies the ink volume set specified for the corresponding pixels as indicated in the following equation (2) by using the acquired substitution volumes SVme, SVc, SVm, and SVy.

$$Mt'=Mt-SVme$$

$$C'=C-SVc$$

$$M'=M-SVm$$

$$Y'=Y-SVy \qquad (2)$$

Note that Mt', C', M', Y' indicate gradation values of the ink volume set after being modified. Further, Mt, C, M, Y indicate gradation values of the ink volume set before being modified.

Then, when the total ink volume of the ink volume set after the substitution processing is larger than a duty limit value (step S66: YES), the controller 20 again modifies the ink volume set such that the ink volume set is not larger than the duty limit value at step S67. The duty limit value indicates an ink ejecting volume defined for each predetermined sheet. For example, the duty limit value is set based on the ink volume which can be ejected without generating bleeding on a sheet. In the substitution processing, other inks of C, M, and Y are substituted for the metallic ink. Therefore, the total ink volume tends to be increased. Therefore, when the total ink volume of the ink volume set after the substitution is larger than the duty limit value, the controller 20 lowers the substitution ratio SR so as to modify the ink volume set such that the total ink volume is not larger than the duty limit value.

Accordingly, with the processing at steps S65 to S67, a modification unit and a modification function according to the invention are realized.

With the above substitution processing, on the image as illustrated in FIG. 6A, for example, the inks of C, M, and Y are substituted for the metallic ink for pixels constituting the background image B and change in the brightness depending on the observation angle θ is lowered. On the other hand, since the metallic index value Dm is high on the image A, the substitution volume of the metallic ink is small.

Thereafter, the controller 20 performs the halftone processing and the interlace processing (steps S7 and S8 in FIG. 3) on the ink volume data constituted by the ink volume set after the substitution processing. Then, the dot data after the interlace processing are output to the printer 200 and actual printing is performed.

As described above, in the embodiment, even when the metallic ink is used, texture of an image can be maintained while suppressing decrease in the contrast.

In addition, the texture at the predetermined observation angle θ can be controlled to be maintained preferentially.

Further, if a configuration in which whether or not the substitution processing is executed can be selected by the user is employed, even when a color which is reproduced by the color conversion LUT only and preference of the user do not fit, color reproduction of a printed material containing the metallic ink is set flexibly so as to be made closer to the preference of the user.

Other Embodiments

That the acquisition of the ink volume corresponding to the input color data is executed on the computer 100 is merely an example. That is to say, the substitution processing may be performed in the printer 200.

The metallic ink to be used as the special ink is merely an example. For example, any ink may be employed as long as the ink generates special glossiness.

Further, a configuration in which the metallic index value Dm is acquired from the ink volume set is merely an example. For example, when a user knows a value of the metallic index value Dm previously, the user may input the metallic index value.

It is to be noted that the invention is not limited to the above-described embodiments and each of the following applications is considered to be also disclosed as one embodiment of the invention. That is, combinations of members and configurations as disclosed in the above embodiments, which can be replaced with one another, are appropriately changed to be applied. Further, the members and the configurations as disclosed in the above embodiments are appropriately replaced by members and configurations in well-known techniques when they can be replaced with one another, and combinations thereof are changed to be applied. In addition, the members and the configurations as disclosed in the above embodiments are appropriately replaced by members and configurations which can be supposed as substitutions of the members and the configurations as disclosed in the above embodiments by those skilled in the art based on well-known techniques, and combinations thereof are also changed to be applied.

What is claimed is:

1. A printing apparatus which performs printing by using special ink for generating special glossiness on a printed material and color inks, the apparatus comprising:
    a controller that, when an image in which an index value indicating a degree of the special glossiness is low and an image in which the index value is high are to be printed adjacently, controls to print the image in which the index value is low by substituting the color inks for the special ink.

2. The printing apparatus according to claim 1,
    wherein the controller controls to print the image by reducing a volume of the special ink and substituting the color inks for the special ink.

3. The printing apparatus according to claim 2,
    wherein the image in which the index value is low contains black ink and the color inks other than the black ink are substituted for the special ink.

* * * * *